United States Patent [19]

Fabry et al.

[11] Patent Number: 5,063,379
[45] Date of Patent: * Nov. 5, 1991

[54] LIQUID CRYSTAL INDICATOR, PREFERABLY FOR MOTOR VEHICLES

[75] Inventors: Ehrenfried Fabry, Nürnberg; Georg Goddard, Wendelstein; Dieter Meyer, Feucht; Hans Petermann; Bernhard Pirkl, both of Nürnberg; Werner Wiedemann, Herzogenaurach, all of Fed. Rep. of Germany

[73] Assignee: Robert Bosch GmbH, Stuttgart, Fed. Rep. of Germany

[*] Notice: The portion of the term of this patent subsequent to Oct. 23, 2007 has been disclaimed.

[21] Appl. No.: 347,776
[22] PCT Filed: Aug. 21, 1987
[86] PCT No.: PCT/DE87/00373
 § 371 Date: Apr. 21, 1989
 § 102(e) Date: Apr. 21, 1989
[87] PCT Pub. No.: WO88/03663
 PCT Pub. Date: May 19, 1988

[30] Foreign Application Priority Data

Nov. 14, 1986 [DE] Fed. Rep. of Germany ....... 3639008

[51] Int. Cl.⁵ .............................................. G09G 3/36
[52] U.S. Cl. .................................. 340/784; 340/702; 340/815.1; 359/103
[58] Field of Search ............... 340/701, 702, 765, 784, 340/815.1; 350/345, 339 F; 362/23, 27, 29

[56] References Cited

U.S. PATENT DOCUMENTS 4,714,983 12/1987 Lang .................................. 350/345
4,965,564 10/1990 Fabry et al. ......................... 340/702

FOREIGN PATENT DOCUMENTS 3302156 7/1984 Fed. Rep. of Germany ...... 340/701
3531736 3/1986 Fed. Rep. of Germany ...... 350/345
0147228 7/1986 Japan ................................. 340/702

Primary Examiner—Jeffery A. Brier
Attorney, Agent, or Firm—Michael J. Striker

[57] ABSTRACT

A display device for measured values, function, status and trouble indications and the like comprising at least one liquid crystal cell having areas with different coloration of the indications, a light guide extending along at least one of these areas at the back side of the liquid crystal cell for enabling different coloration of the one area and a light source arranged at an end area of the light guide for illuminating the liquid crystal cell.

8 Claims, 2 Drawing Sheets

LIQUID CRYSTAL INDICATOR, PREFERABLY FOR MOTOR VEHICLES

BACKGROUND OF THE INVENTION

The invention relates to a display device preferably for motor vehicles for measured values, trouble indications and the like comprising at least one liquid crystal cell, illuminated from the rear to have areas with different colorations of letters, symbols, or indications illuminated.

In a known display device of this type, areas of the liquid crystal cell with various coloring of the letters and symbols and the data to be displayed, respectively, are provided by color foils which are inserted between the liquid crystal cell and a transflector arranged behind the latter, so that a good coloration is achieved in bright ambient light as well as in darkness (Elektronik, 1983, 19, page 16). In addition, it is also known to arrange a corresponding color imprint on the back of the LCD in the areas with different coloration when using transmissive LCDs. This is particularly desirable in large liquid crystal displays in motor vehicles where warning or trouble indications are to be emphasized over other indications, such as time, velocity, engine speed and the like, by different colors.

However, a disadvantage in the known solutions is that each area of the LCD can only have one color assigned to it. If different colors are desired in the various areas of the LCD, in each instance, in different types of vehicles it is necessary to have available a corresponding wide assortment of liquid crystal cells, which requires a considerable expenditure on storage. It is also disadvantageous that the different coloring produced by foils or color printing also affects the blocked areas of the LCD which are not being controlled, so that an unwanted background brightness varying in color and intensity results in these areas.

SUMMARY OF THE INVENTION

The object of the present invention is to make it possible to freely select a different coloring in different areas of the LCD at any time so as to provide complete flexibility for the selection of the coloration with limited storage.

This object is achieved in the display device, according to the invention, by providing at least one light guide at the rear side of an area so that the areas of the LCD with different coloring can be delimited relative to one another and can be illuminated by variously colored light sources. The desired coloring can be freely chosen, since the desired coloring is effected only after the assembly of the display device with the insertion of the light sources in the individual areas of the LCD. Another advantage consists in that a uniform background brightness is made possible in the blocked areas of the LCD by known measures, such as e.g., the arrangement of scattering foils and fluorescent plates, screen print and the like, and in that a uniform transmission of light in the controlled surface area segments of the LCD is achieved. The transition of colors between the areas of different coloration can be made so smooth in this way that a very good visual appearance results accordingly.

It is particularly advantageous to arrange a plurality of light sources of different colors at the rear end area of the light guide in order to enable a change of color in an area of the LCD by switching the bulbs. Accordingly, it is possible, in addition, to provide a bulb with white light for a uniform background brightness of the LCD. If, for example, the area is provided in the vehicle for function and status indications of various devices, it is advantageous to switch on a green light for displaying normal values and functions. In contrast, a red light is switched on for this area of the LCD when displaying disturbances, wherein the trouble indication is distinguished on the LCD e.g. by intermittent illumination of the problem function.

Moreover, the use of light guides for illuminating the LCD has the advantage that the light sources can be arranged laterally next to, behind or outside the display device, so that the space requirement for the illumination of the LCD is very small and the construction design of the display device is accordingly not unnecessarily impaired. A particularly flat construction can be realized in that the light guide is formed in a wedge-shaped manner behind the LCD and the colored light sources are arranged at the side of the light guide with the thicker end area. It is particularly advantageous if the LCD comprises two adjacent wedge-shaped light guides at its rear side at two adjacent areas of different coloration, the light sources of the light guides being arranged at two opposite sides of the LCD. Since the areas of different coloration of the LCD can be very different with respect to dimensioning, it can be particularly advisable to illuminate the smaller area via one light guide and the larger area of the LCD by a bulb arranged in a light shaft behind the LCD. In order to achieve a uniform background brightness of the LCD, it is advantageous to construct the light guide behind the adjoining area of the LCD to be illuminated with different colors in such a way that a portion of the light from the bulb enters the light shaft in a rear end area of the light guide and exits again at the area of the LCD covered by the light guide. The light guide, with the exception of the coupling and decoupling surfaces of the light, is advisably coated with a reflecting film.

The present invention as to its construction so to its mode of operation, together with additional objects and advantages thereof, will be best understood from the following detailed description of preferred embodiments with reference to appended drawings.

DESCRIPTION OF THE PREFERRED EMBODIMENTS

Figure 1:
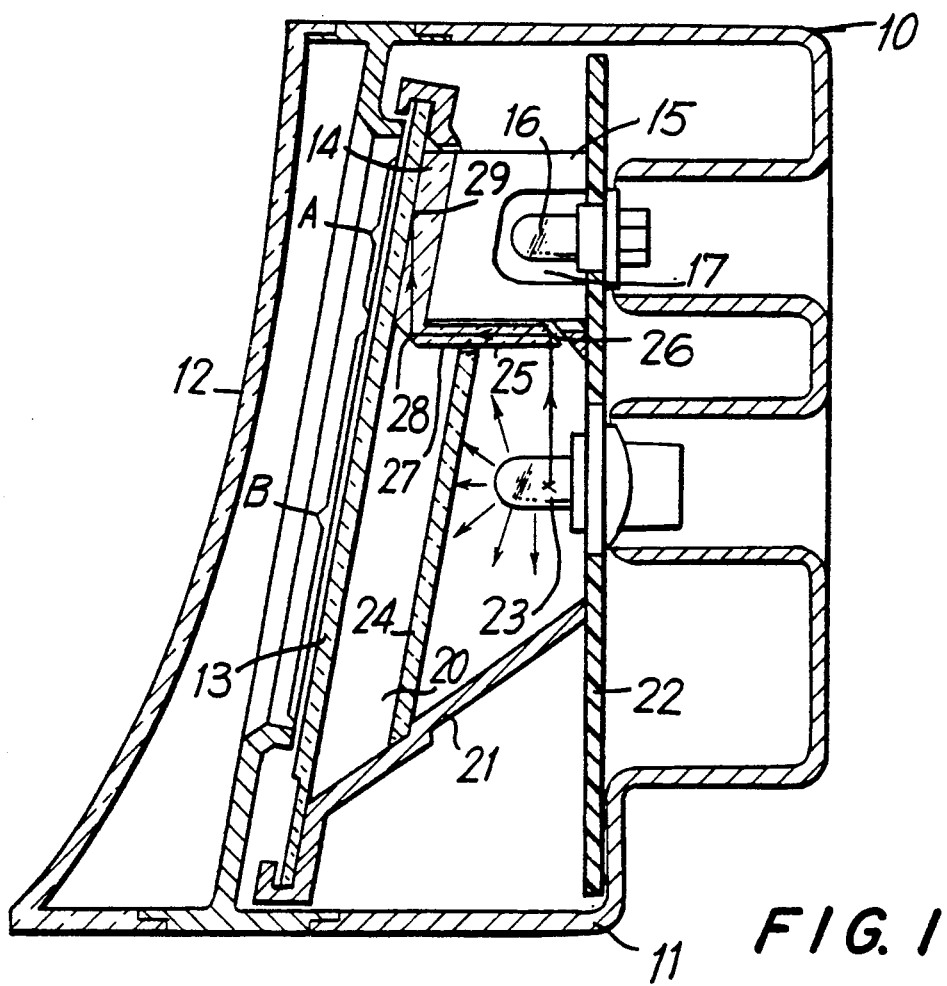
FIG. 1 shows a cross-sectional view of an LCD display device according to the invention comprising two areas of the LCD with different colors and a light guide behind one the two areas.
Figure 2:
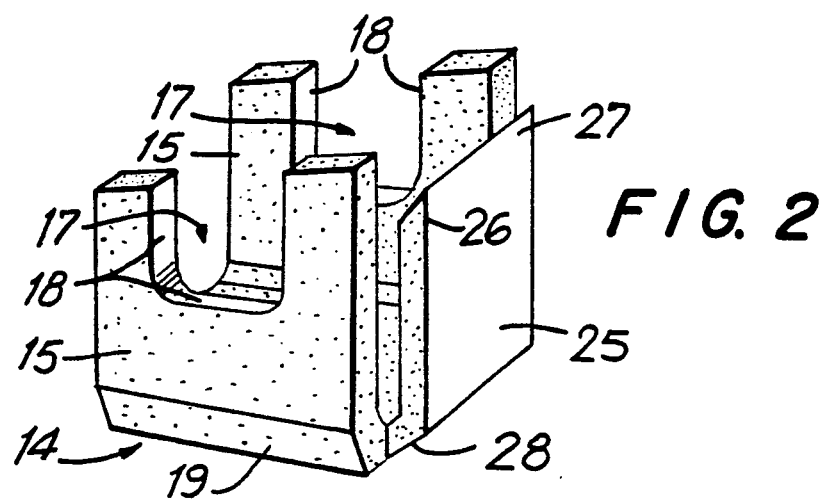
FIG. 2 shows an enlarged perspective view of the light guide shown in FIG. 1.

In FIG. 1, a display device for a motor vehicle with a large liquid crystal display is designated by 10. A housing 11 consisting of multiple parts carries, on the front, a transparent cover plate 12, behind which a transmissive liquid crystal cell 13 of the customary known construction is enclosed in the housing 11. The liquid crystal cell 13 comprises two areas A and B which are arranged next to one another and lie one above the other, respectively, and which are to be illuminated with different colors in the different controlled segments. Letters, symbols and indications are to be realized by the controlled segments of the liquid crystal cell 12, wherein the upper area A serves to display various functions and states which must be monitored and which are displayed continuously or when disturbances occur, respectively, by an electronic device, not shown. The area B serves to display other data, scales and the like, whose segments are controlled in a corresponding manner by the electronic device. A light guide 14, which is shown in FIG. 2 in a three-dimensional manner and in enlarged scale, is arranged at the rear side of the liquid crystal cell 13 in the upper area A and extends along this area. The light guide 14 has two prolongations 15 at its opposite sides, which prolongations 15 are directed away from the liquid crystal cell 13. Two differently colored bulbs 16 are arranged adjacent to one another at a distance at the rear end area of the prolongations 15 in the display device 10 and are positioned in such a way that each bulb projects into a U-shaped recess 17 of the prolongations 15. Whereas the front bulb 16, which can be seen in FIG. 1, gives off a red light, the bulb 16 for the second prolongation 15, which bulb 16 is arranged at a distance behind the front bulb 16 and is not shown in FIG. 1, gives off a green light. The lights are switchable, so that the green bulb 16 is switched on during the display of normal functions in the area A of the liquid crystal cell 13 and the red bulb 16 is switched on during the occurrence of disturbances. The light from the bulb 16 enters the coupling surfaces 18 in the area of the U-shaped recess 17 at the rear end area of the light guide 14. It is then deflected via a bevel 19 of the light guide 14 in such a way that it exits at its front end area, which is arranged behind the liquid crystal cell 13, so as to be uniformly distributed at the surface directed toward the liquid crystal cell 13.

Adjacent to and below the area A of the liquid crystal cell 13 covered by the light guide 14, a light shaft 20 is behind the area B of the liquid crystal cell 13, its side walls 21 serving as reflectors and its base being formed by an insulating material plate 22 which carries an additional bulb 23. This bulb 23, which is preferably white, is to uniformly illuminate the area B of the liquid crystal cell 13. A scattering foil 24, which can possibly be colored yellow, orange or another contrast color, or a correspondingly colored fluorescent plate, respectively, is arranged in the light shaft 20 and can be provided, in a manner known per se, at the rear side with a screen print consisting of an opaque material for a uniform illumination of the liquid crystal cell 13 within the area B. In order to achieve a uniform background brightness of the liquid crystal cell 13 in the surface areas not controlled also when the bulbs 16 are switched off, the light guide 14 is provided with an additional prolongation 25 behind the area A of the liquid crystal cell 13, which prolongation 25 projects into the light shaft 20 and comprises an additional bevel 26 at the rear end area. The prolongation 25 has a light large coupling surface 27 directed toward the bulb 23 in the light shaft 20, a portion of the light of the bulb 23 entering into the light guide 14 at this coupling surface 27. As indicated in the drawing by arrows, a portion of the light of the bulb 23 is directed to the area A of the liquid crystal cell where it exits in a uniform manner at the surface of the light guide 14 directed toward the area A as decoupling surface 29 via the bevel 26 and an additional bevel 28 in the front of the prolongation 25. In order to obtain the best and most uniform illumination of the area A of the liquid crystal cell 13, the light guide 14, with the exception of the coupling surfaces 18 and 27 and the decoupling surface 29 of the light behind the area A of the liquid crystal cell 13, is provided with a reflecting film which is vaporized on. The uniform decoupling of the light at the surface 29 can also be achieved by a screen color print at the back of the light guide 14.

Figure 3:
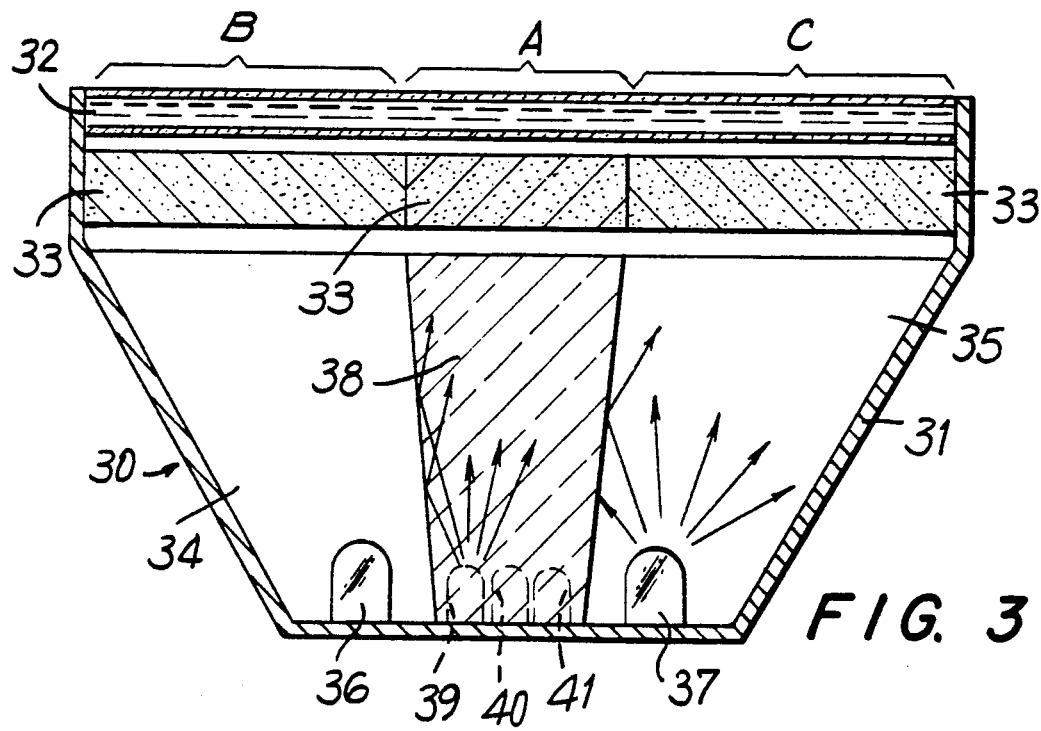
FIG. 3 shows a cross-sectional view of an LCD display device according to the invention with three areas of different coloration and a light guide behind the middle area.

In another embodiment shown in FIG. 3, a display device for a motor vehicle has large liquid crystal display, which display device is designated by 30. A housing enclosure 31 carries, on the front, a transmission liquid crystal cell 32 of a customary known construction, in which a liquid crystal substance is introduced and sealed between two glass plates comprising electrodes. The liquid crystal cell 32 comprises three adjacent areas A, B and C having different coloration for letters, symbols, scales and the like indications, wherein the middle area A serves to display various functions and states which must be monitored and which are displayed continuously or when disturbances occur, respectively. The areas B and C located adjacent to the latter serve to display other data, scales and the like. Fluorescent plates 33, which can be colored e.g. yellow, orange or red and are arranged behind the liquid crystal cell 32 so as to be adjacent to one another, are assigned to the areas A, B and C of the liquid crystal cell 32. Correspondingly colored scattering foils can also be provided in place of or in addition to the fluorescent plates 33. The plates 33 or the scattering foils can be provided, in a manner known per se, with a screen print consisting of an opaque material which serves for a uniform illumination of the liquid crystal cell 32 within the individual areas A, B and C by punctiform light sources. Light shafts 34 and 35 are provided behind the plates 33 in the areas B and C of the liquid crystal cell 32, which light shafts 34 and 35 are formed substantially by the housing enclosure 31 which is correspondingly coated on the inside so as to serve as a reflector. Bulbs 36 and 37 with white light are inserted in each instance at the base of the light shafts 34 and 35 as a light source and serve for the background brightness in the areas B and C of the liquid crystal cell 32 as well as for the illumination of the controlled segments in these areas. A light guide 38 is arranged as a block with trapezoidal cross section behind the middle area B of the liquid crystal cell 32 and is directed with its larger base side toward the liquid crystal cell 32 and with its smaller base side toward a plurality of bulbs 39, 40, 41 located next to one another. Of these bulbs, e.g. the middle one 40 has white light, whereas the bulb 39 on the left emits green light and the bulb 41 on the right emits red light. While the bulb 40 with white light is continuously switched on in order to achieve a background brightness in the blocked surface areas of the liquid crystal cell 32 in area A, the bulbs 29 and 41 can be switched as desired, depending on the wiring arrangement of the electronic device, for the display of disturbances or for functions and status indications, so that the coloring of the indication in area A of the liquid crystal display can be changed.

Figure 4:
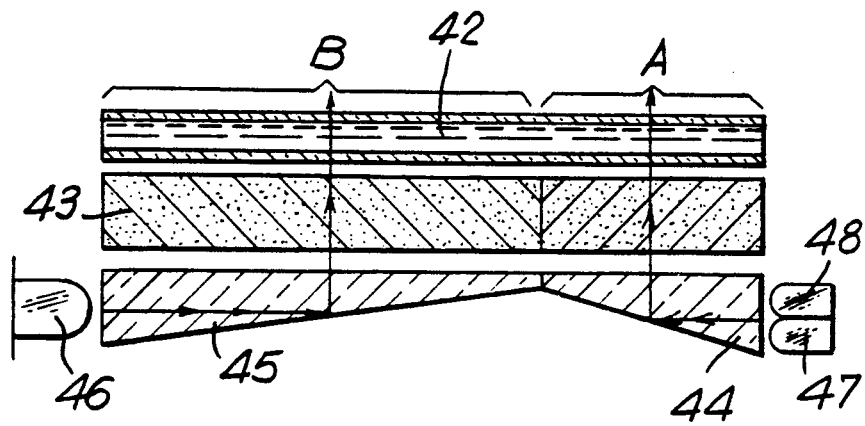
FIG. 4 shows a cross-sectional view of an LCD display according to the invention with a wedge-shaped light guide behind two areas of the LCD having different colors.

Another embodiment of a display device according to the invention is shown in FIG. 4. In this case, a liquid crystal cell 42 for a large display is partitioned into two display areas A and B having different coloration. Two scattering foils 43 or colored fluorescent plates, which abut at one another and are assigned to the areas A and B, are arranged behind the liquid crystal cell 42. Located behind the latter are two wedge-shaped light guides 44 and 45, each of which covers an area A and B, respectively, of the liquid crystal cell 42. The light sources for the illumination of the areas A and B are arranged in this instance at two opposite sides of the liquid crystal cell 42 in the area of the light guides 44 and 45. The light guides 44 and 45 abut one another at the sides having a small thickness. A white bulb 46 is arranged at the light guide 45 for the area B of the liquid crystal cell 42 on the opposite thicker side and two adjacent, differently colored, switchable bulbs 47 and 48 are arranged at the thicker side of the light guide 44 for the area A. An additional white bulb can be provided in this instance for a uniform background brightness.

The various embodiment show that the invention is not to be limited to a certain embodiment of a light guide or light guides behind the liquid crystal cell. Also, the arrangement of the different bulbs need not be situated within the display device. Rather, the light guide, which is provided for at least one of the areas of the liquid crystal cell, can also project out of the display device, so as to enable an arrangement of a colored light source for illuminating this area of the liquid crystal cell outside the display device at an easily accessible place in order in this way to realize a display device having a very flat construction and to facilitate the changing of a defective light source. Moreover, a different coloring for the area of the liquid crystal display assigned to the light guide can be realized and freely selected at any time by exchanging the light source. In addition, it is possible, within the framework of the present invention, to arrange a scattering foil, a fluorescent plate, a filter and/or a polarizer, as desired, between the light guide and the liquid crystal cell. The light guide is designed in such a way that the colored light entering into it only exits from the surface which lies behind the area of the liquid crystal cell assigned to it, whereas the colored light is prevented from exiting on the adjacent area of the liquid crystal cell by means of total reflection or coating of the light guide. Depending on the construction, one, two or more switchable colorings are possible in the illumination of the area of the liquid crystal cell assigned to the light guide.

While the invention has been illustrated and described as embodied in a liquid crystal display device for motor vehicles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A display device for measured values, functions, status, and trouble indications and comprising at least one liquid crystal cell having a rear side and a plurality of areas for displaying letters, symbols or indications to be colored with different colorations; a light guide arranged at said rear side along at least one of said plurality of areas and having an upper surface facing said liquid crystal cell and an end portion; light source means arranged at said end portion for illuminating said liquid crystal cell, light being transmitted to said liquid crystal cell through said upper surface of said light guide, said light source transmitting a color light to said end portion of said light guide; a light shaft located behind said liquid crystal cell adjacent to said light guide; and an incandescent light source located in said light shaft, said light guide having a light coupling surface for transmitting a portion of light from said incandescent light source to said at least one of a plurality of areas to provide a uniform background brightness of the liquid crystal cell.

2. A display device according to claim 1, wherein said light source means comprises a plurality of separately actuatable light sources of different colors.

3. A display device according to claim 1, wherein said light guide has two opposite sides comprising respective prolongations extending away from said liquid crystal cell and having respective end areas defining said end portion of said light guide, said light source means comprising two light bulbs of different colors arranged at said end areas, respectively.

4. A display device according to claim 3, wherein each of said respective prolongations has an U-shaped recess defining a respective end area, each of said light bulbs projecting into a respective U-shaped recess.

5. A display device according to claim 1, wherein said incandescent light source illuminates an area of said liquid crystal cell located adjacent to said at least one of said plurality of areas.

6. A display device according to claim 5, wherein said light guide comprises a prolongation having an end area located behind said liquid crystal cell and said light coupling surface comprises a bevel arranged in said end area for receiving said portion of light from said incandescent light source to provide for transmission of said portion of light to said liquid crystal cell.

7. A display device according to claim 1, wherein said light guide has light coupling and decoupling surfaces and other surfaces, said other surfaces being coated with a reflecting film.

8. A display device according to claim 1, further comprising at least one transparent body located between said liquid crystal cell and said light guide to provide a uniform illumination of said liquid crystal cell.

* * * * *